Nov. 28, 1944. C. W. MOTT 2,363,986
LOAD-MOVING MACHINE
Filed Nov. 21, 1942 6 Sheets-Sheet 1
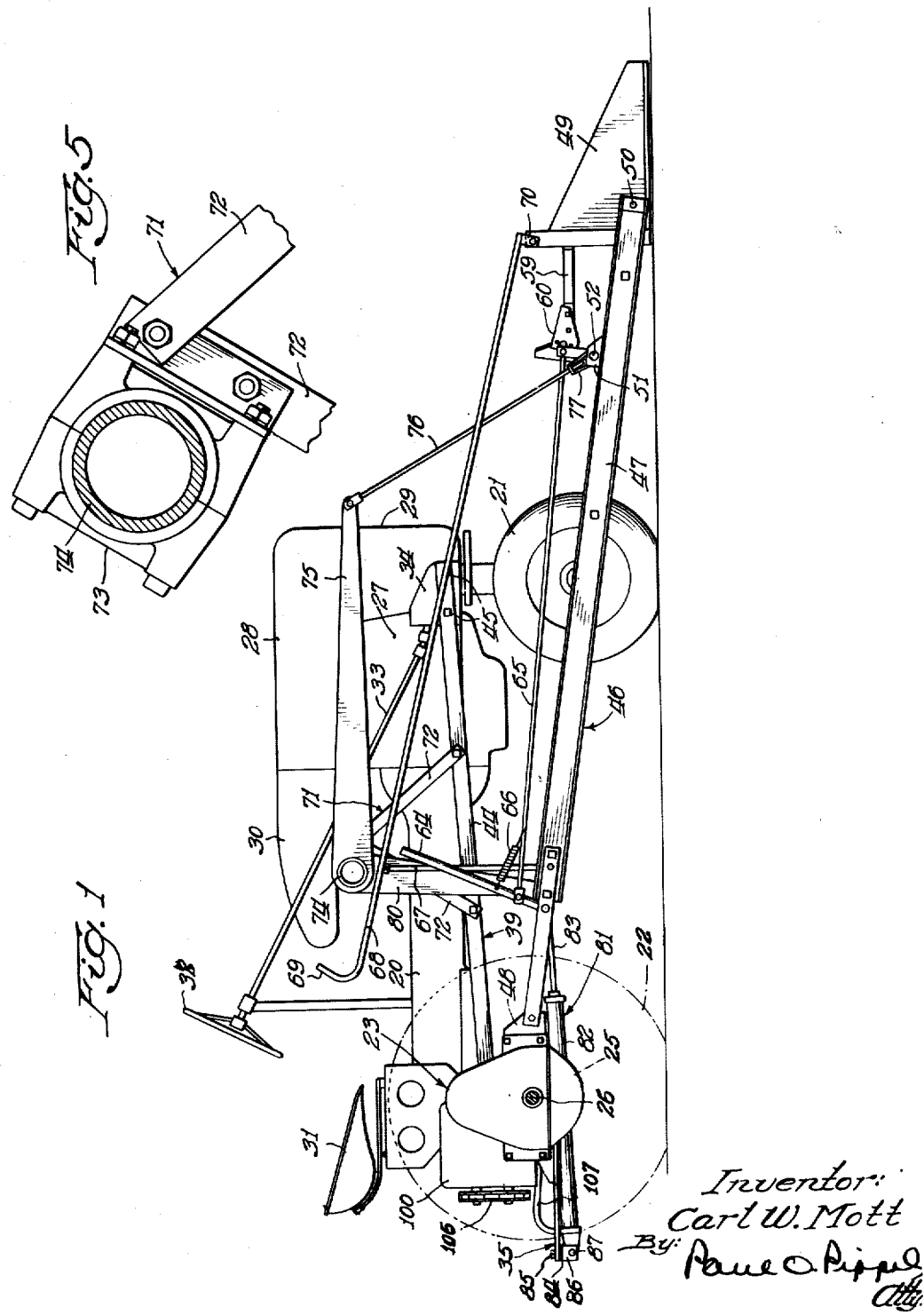
Inventor:
Carl W. Mott
By: Paul O. Pippel
Atty.

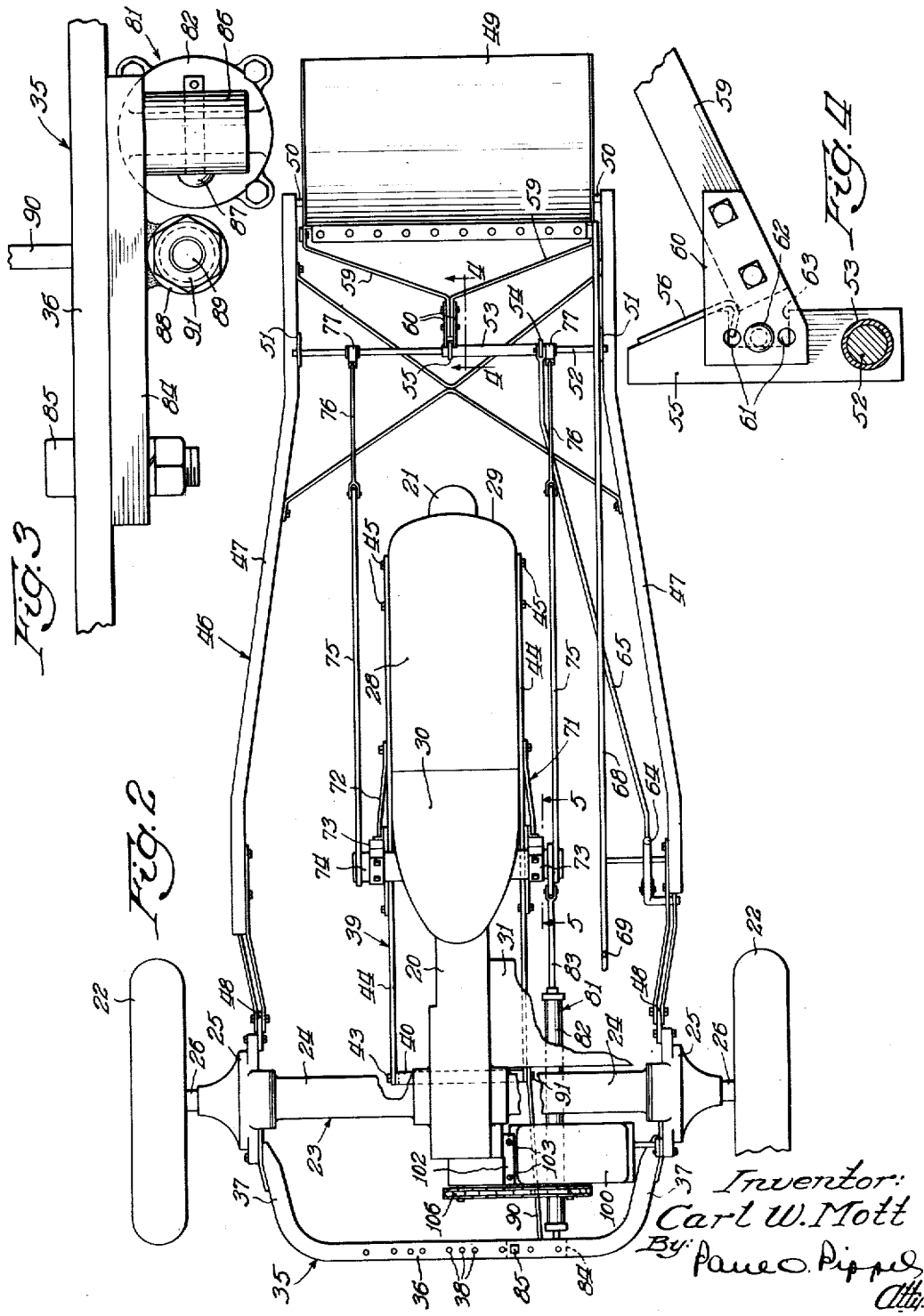

Nov. 28, 1944. C. W. MOTT 2,363,986
LOAD-MOVING MACHINE
Filed Nov. 21, 1942 6 Sheets-Sheet 3
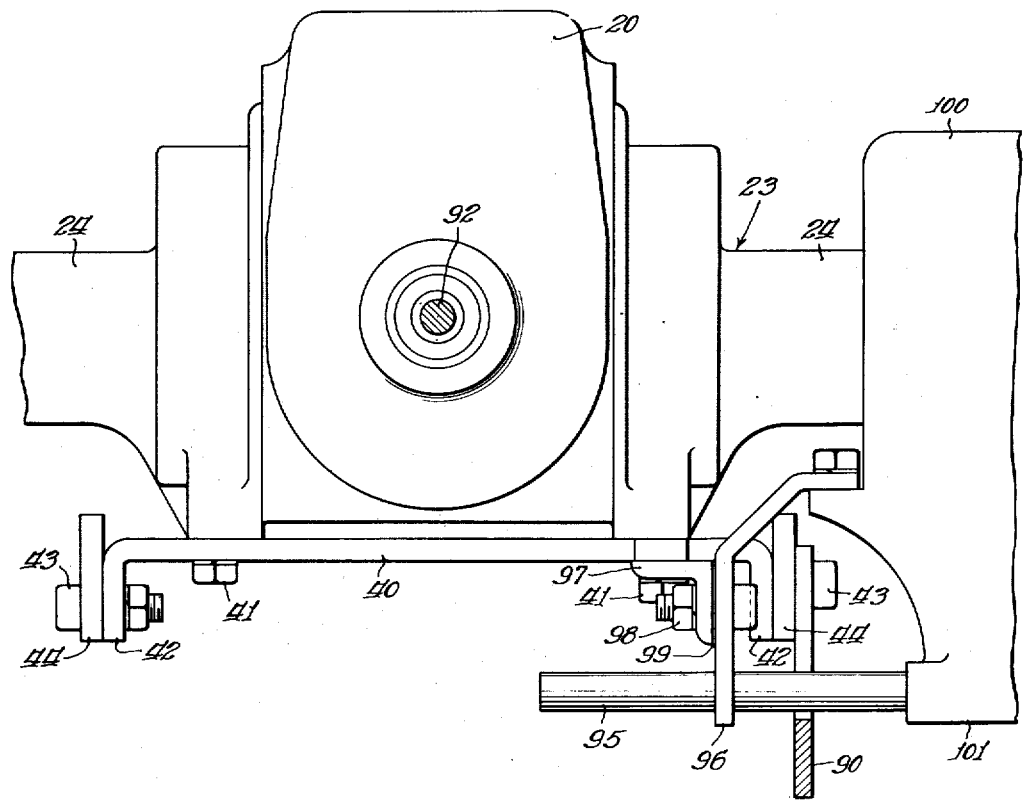
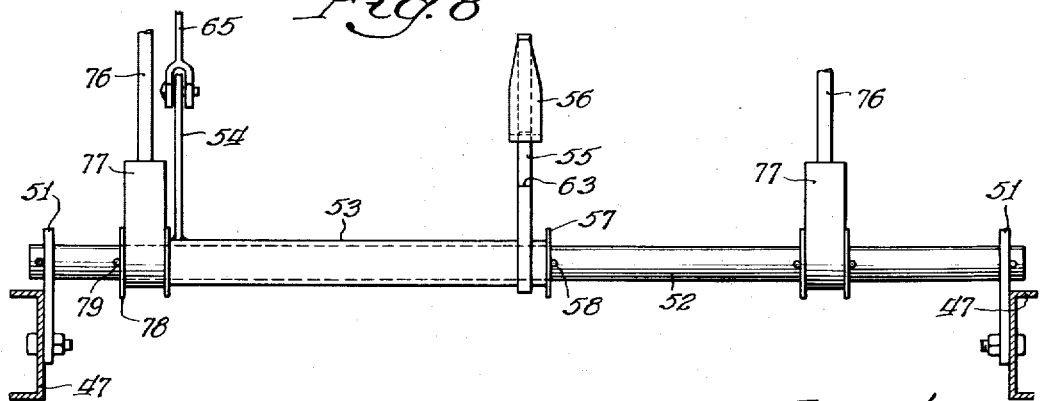
Inventor:
Carl W. Mott

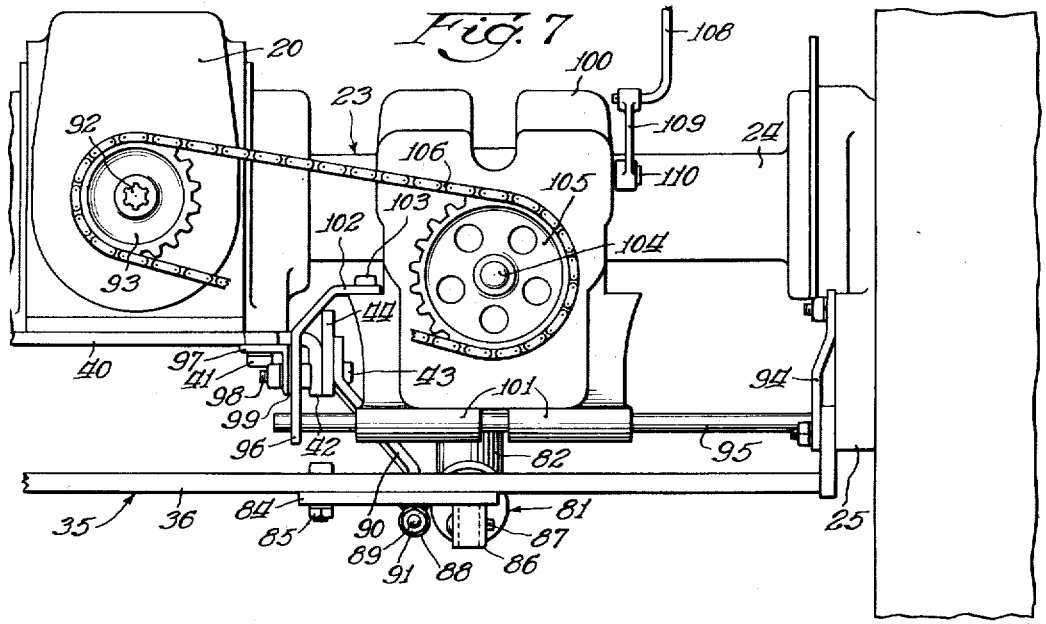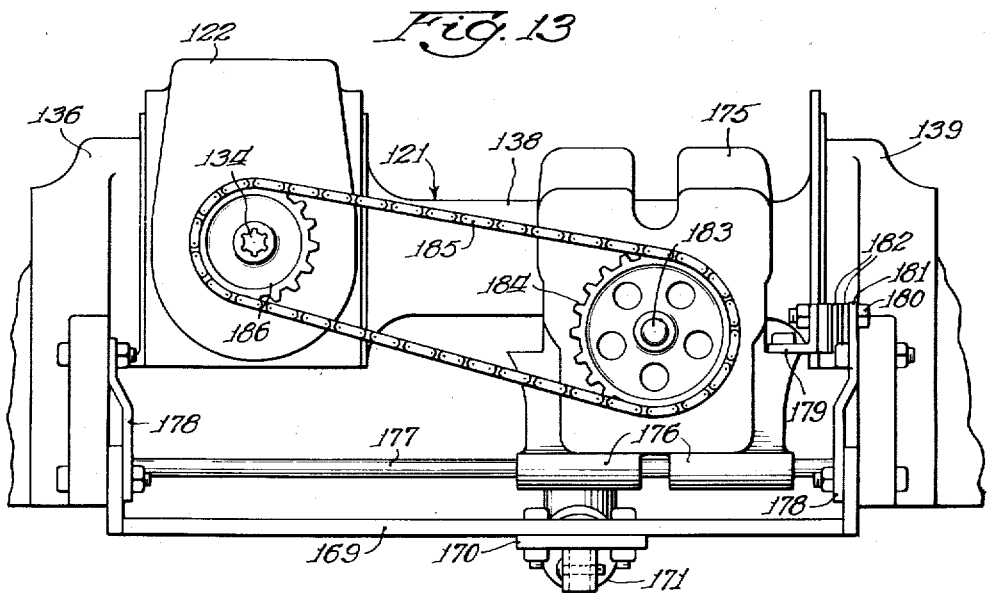

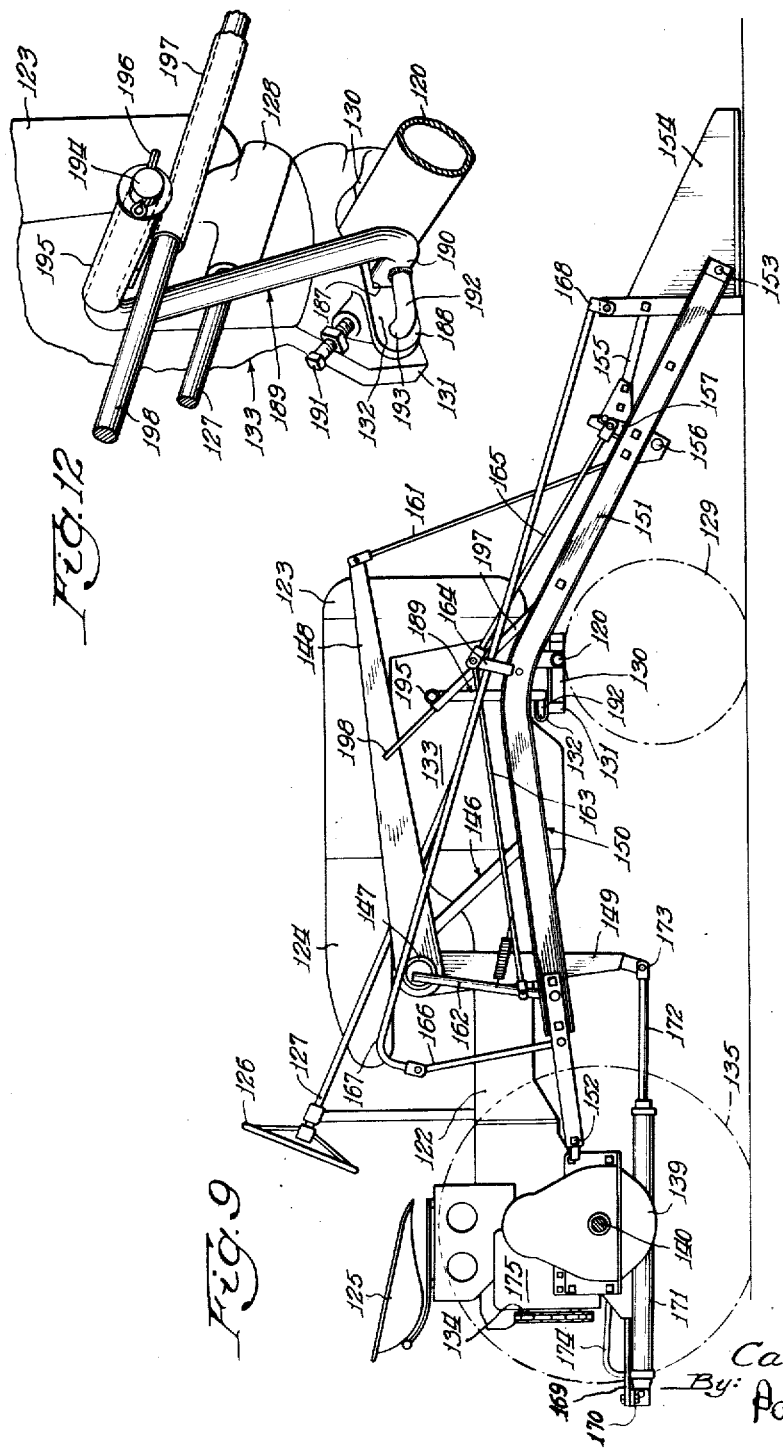

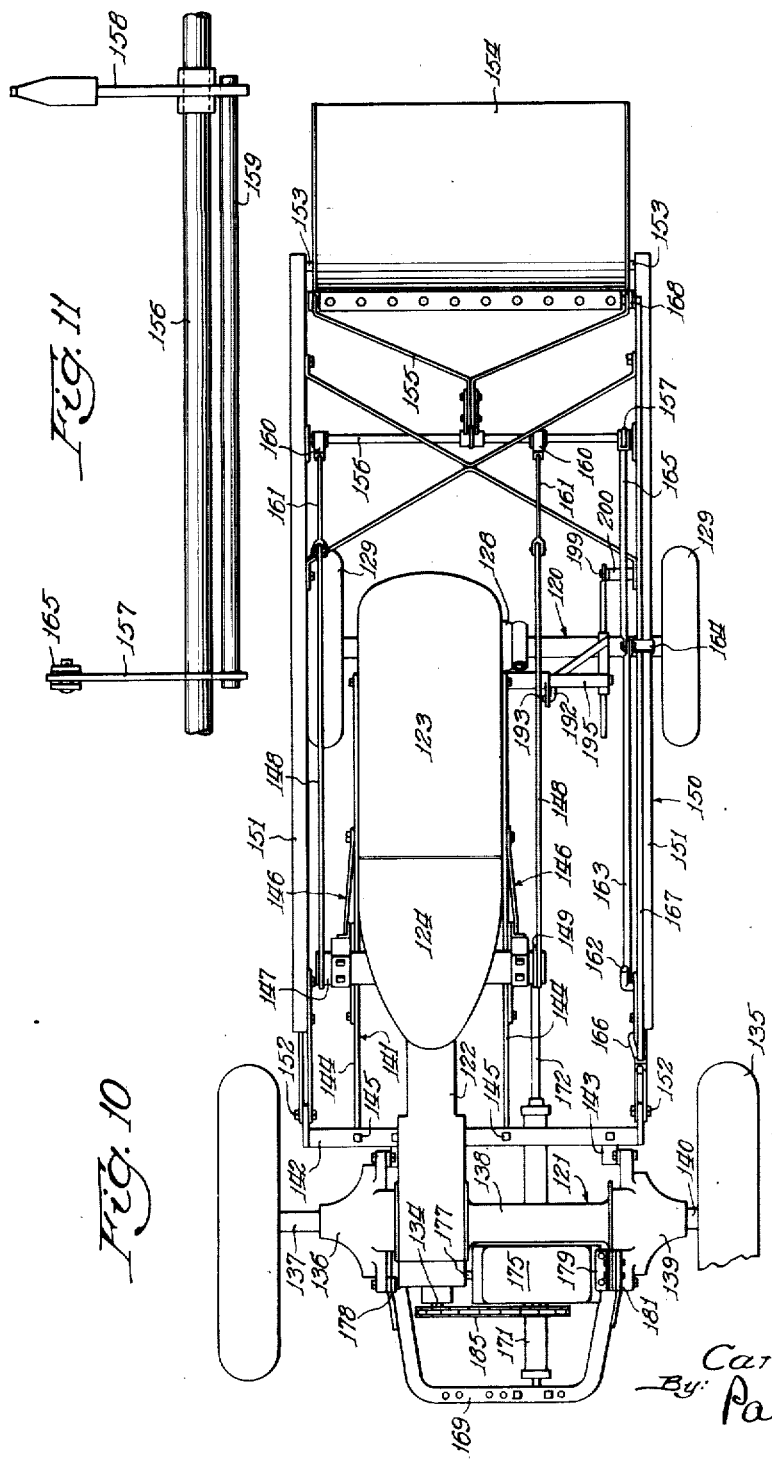

Patented Nov. 28, 1944

2,363,986

UNITED STATES PATENT OFFICE 2,363,986

LOAD-MOVING MACHINE

Carl W. Mott, La Grange, Ill., assignor to International Harvester Company, a corporation of New Jersey Application November 21, 1942, Serial No. 466,462

29 Claims. (Cl. 214—140)

This invention relates to a load-moving machine and more particularly to a tractor-mounted load mover.

The invention pertains especially to improvements in the structure of machines of the type known as power loaders adapted for use on farms for the gathering, transporting, and dumping of loads of various kinds of material. A typical machine of this general class usually comprises an agricultural tractor carrying at its front end on a longitudinal beam structure a load-carrying element in the form of a scoop or the like. The machine is adapted to be driven into a pile of material and power means are provided for elevating the beam structure and scoop so that the machine may be driven elsewhere for the discharging of the load.

The principal object of the invention is to provide an improved machine of the general class referred to and to incorporate improvements in the design and structure of the load-moving means and the power-actuated means for controlling the elevation and dumping of loads gathered and transported by the load-carrying element or scoop.

An important object is to provide improved lifting structure including a transverse rockshaft preferably disposed substantially intermediate the ends of a longitudinal body of a tractor and to provide power-operated means for rocking the rock-shaft to raise and lower the load-moving means.

Other objects are to provide the power-actuated means in the form of a fluid-pressure device; to dispose this device preferably below the tractor body; to connect the device to the rear axle structure of the tractor and preferably to the tractor draw-bar; and to provide bracing means between the tractor and the tractor draw-bar.

Still other objects of the invention are to provide improved fluid-transmission means in the form of a hydraulic pump for the fluid-pressure device; to mount the pump on the rear axle structure of the tractor; to drive the pump from the power take-off of the tractor; and to provide means mounting the pump for adjustment in its supports.

Another object of the invention is to provide an improved load-carrying machine especially adapted for mounting on a tractor of the agricultural type, which has a narrow longitudinally extending body; another object is to provide a machine for a particular type of agricultural tractor having a longitudinal body offset laterally from the common longitudinal centerline between the front and rear axle structures of the tractor.

Other objects of the invention are to provide stabilizer means for resisting relative transverse movement between the tractor and the load-moving means; to provide improved control means for dumping the load-carrying element or scoop and to provide other refinements in structure, such as will appear in greater detail in the following description of preferred embodiments of the invention as illustrated in the accompanying sheets of drawings, in which:

Figure 1 is a side elevational view of a load-moving machine as mounted on one form of tractor;

Figure 2 is a plan view of the same machine;

Figure 3 is an enlarged fragmentary view showing the structure of the connection between the power-actuated device and the tractor draw-bar;

Figure 4 is an enlarged fragmentary view, showing a portion of the latch mechanism, taken on the line 4—4 of Figure 2;

Figure 5 is a transverse sectional view on an enlarged scale, taken on the line 5—5 of Figure 2;

Figure 6 is an enlarged rear view showing a portion of the auxiliary or sub-frame and mounting of the fluid pump on the tractor;

Figure 7 is a view similar to Figure 6 showing in greater detail the mounting of the fluid pump;

Figure 8 is an enlarged view of a portion of the latch mechanism for dumping the load-carrying element;

Figure 9 is a side elevational view of a modified form of machine;

Figure 10 is a plan view of the machine shown in Figure 9;

Figure 11 is a view showing a portion of the latch mechanism for the machine shown in Figures 9 and 10;

Figure 12 is a perspective view of a portion of the front end of the tractor shown in Figure 9 and illustrating stabilizer means between the tractor and the beam structure of the load-moving means; and Figure 13 is a rear view showing the mounting of the pump for the machine shown in Figures 9 and 10.

As previously stated, the invention is directed particularly to the provision of improvements in load-moving machines adapted for use with farm tractors. However, it will be understood that the principles of the invention may be applied in other instances. Accordingly, the disclosure herein is to be taken as illustrative and not limiting.

The vehicle or tractor shown in Figures 1 and 2 is representative of the usual type of farm tractor and has a narrow longitudinal body 20 carried at its front end on a wheeled truck 21 and at its rear end on a pair of transversely spaced drive wheels 22 forming part of a rear axle structure 23. This structure includes a pair of opposite transversely extending axle housings 24, each having at its outer end a depending gear housing 25 carrying a stub axle 26 connected to the respective drive wheel 22. The body 20 carries at its forward end a power source in the form of an internal combustion engine or power plant 27. A hood structure 28 including a front grille 29 overlies the engine 27. A fuel tank 30 preferably forms a rearward extension of the hood 28 and is spaced vertically above the body 20. The rear end of the body carries an operator's station 31 ahead of which is located a steering wheel 32 connected by a steering rod 33 to steering mechanism enclosed in a housing 34 for steering the front truck 21.

A rear support in the form of a draw-bar 35 includes a transverse bight portion 36 and opposite forwardly extending leg portions 37 and is disposed at the rear of the tractor with the portions 37 respectively secured to the depending gear housings 25 of the rear axle structure 23. The portion 36 of the draw-bar is provided with a plurality of vertical openings 38. It will be understood that the tractor just described is representative of the usual form of agricultural tractor and that the improved structure to be hereinafter described may be attached to any form of vehicle, particularly vehicles of the type illustrated.

The tractor is preferably provided with an auxiliary or secondary frame or sub-frame indicated generally at 39. This frame comprises a first transverse support 40 preferably secured by bolts 41 to the underside of the rear axle structure 23 (Figure 6). Each end of the support 40 is provided with a downwardly extending portion 42 apertured to receive a pin or bolt 43. The sub-frame further includes a pair of longitudinally extending frame members 44 disposed respectively at opposite sides of the tractor body 10 and connected at their forward ends by attaching bolts 45 to opposite sides of the front portion of the body 10. The rear ends of the frame members or bars 44 are connected by the bolts 43 to the rear transverse support 40.

The load-moving means preferably comprises a longitudinally extending beam structure indicated generally at 46. This structure includes a pair of longitudinal, generally parallel beams 47 pivoted on a transverse axis to the rear axle structure 23. The pivot means preferably comprises a bracket 48 for each beam, these brackets being respectively secured to the depending gear housing 25 of the rear axle structure. The forward portions of the beams 47 extend ahead of the front wheeled truck 21 of the tractor and carry therebetween a load-carrying element in the form of a scoop 49. The scoop is pivoted between the beams 47 on a transverse axis provided by a pair of trunnion members 50.

Each of the beams 47 is provided adjacent its forward end with an upstanding bracket 51. These brackets serve to carry a transverse support in the form of a shaft 52. As best shown in Figure 8, the shaft 52 journals a sleeve 53 rigidly carrying at one end thereof an upstanding arm 54 and rigidly carrying at the other end thereof an upstanding arm 55 provided with a latch hook 56. A collar 57 and pin 58 prevent lateral displacement of the sleeve 53 on the shaft 52. The scoop 49 includes a pair of rearwardly converging members 59 secured together and to a pair of transversely spaced, longitudinally extending plates 60. Each of the plates is provided with a plurality of transverse openings 61 and a pair of alined openings carries a transverse latch pin 62. In the normal position of the latch member 56, the pin 62 is engaged and the scoop is held against pivoting about its trunnions 50. The arm 55 is cut out as at 63 so that the pivoting of the scoop in a rearward direction is prevented.

The right-hand beam 47 carries at its rear end an upstanding longitudinally swingable hand lever 64 pivotally connected to the rear end of a forwardly extending control link 65. The forward end of the link is pivotally connected to the upstanding arm 54 on the sleeve 53. A tension spring 66 is connected between the lever 64 and the link 65 to maintain these parts in normal position. It will be seen that the lever 64 may be rocked to release the latch mechanism 56—62.

The right-hand beam carries a second longitudinally swingable member 67, to the upper end of which is pivotally connected a control rod 68 having a handle portion 69 disposed in the vicinity of the operator's station 31. The rod 68 is connected at its forward end by a pivot bracket 70 to the upper end of the rear portion of the scoop 49.

The sub-frame 39 provides intermediate the front and rear ends of the body 20 supporting structure 71 for the carrying of lift means for raising and lowering the beam structure 46. This supporting structure preferably comprises a pair of upwardly converging supporting bars 72 on each sub-frame bar 44. The upper ends of each pair of bars are connected together and carry a split bearing 73 consisting of a pair of bearing halves secured together to provide for the journaling of a transverse rock-shaft 74, preferably in the form of a tube or sleeve. The rock-shaft 74 carries at each of its opposite ends a forwardly extending lift arm 75. These arms are rigidly secured to the rock-shaft, preferably by welding. These arms extend forwardly slightly ahead of the grille structure 29 of the tractor and are pivotally connected to the upper end of a downwardly extending link 76. The lower end of this link is provided with a strap 77 embracing the cross-shaft 52 between the brackets 51 on the beams 47. A washer 78 and pin 79 cooperate with the strap 77 and the collar 57 and pin 58 to complete the means for preventing lateral displacement between the sleeve 53 with respect to the shaft 52. In this manner the lift arms 75 are connected to the beam structure 46.

The right-hand extreme end of the rock-shaft 74 has rigidly secured thereto a force arm 80. This arm extends downwardly alongside the tractor body 20 to a point below the body and substantially in longitudinal horizontal alinement with the draw-bar 35. The arm and the draw-bar are connected by force-exerting means preferably in the form of a fluid-pressure device 81 comprising a cylinder 82 and reciprocating piston 83. The forward end of the piston is connected to the lower end of the force arm 80.

As best shown in Figure 3, the draw-bar 35 carries at its transverse portion 36 an attaching member 84 for the rear end of the hydraulic cylinder 82. This member extends a short distance transversely of the draw-bar portion 36 and is pivotally connected at one end by a bolt and nut 85 passing through one of the openings 38 in the draw-bar. The other end of the member 84 has a downwardly extending ear 86 provided with a transverse pin 87 connected to the rear of the cylinder 82.

The member 84 rigidly carries at its intermediate portion a threaded collar 88 which receives a threaded end 89 of a longitudinally extending brace 90. This brace is connected at its forward end by the bolt 43 at the right side of the tractor that forms the connection between the right hand sub-frame member 44 and transverse support 40 (Figure 6). A nut 91 is threaded on the end 89 of the brace 90 and thus rigidly secures the brace to the cylinder support 84. The threaded connection between the support or member 84 provides means for the adjustment of the support with respect to the draw-bar 35. The brace 90 serves as additional means between the tractor and draw-bar for bracing the draw-bar against forces applied by the pressure device 81 in the raising and lowering of the beam structure 46 by means of the force arm 80 and lift arms 75 of the lift means.

The tractor includes a rearwardly extending power take-off shaft 92 on which is keyed a driving sprocket 93. The shaft 92 is driven in the usual manner from the engine or power plant 27.

Another important feature of the invention is the provision of a fluid pump and the mounting thereof for the operation of the pressure device 81. As best shown in Figure 7, the right-hand depending gear housing 25 is provided with a bracket 94, at the lower end of which is secured a transversely extending support in the form of a shaft 95. The inner end of the shaft is supported in a bracket 96 associated with a longitudinally extending support in the form of an angle bar 97 rigidly secured to the rear axle structure 23, preferably by means of the bolt 41 that secures the transverse support 40 to the axle structure. The connection between the angle bar 97 and bracket 96 is preferably made by a removable bolt 98 and a shim 99. As will be hereinafter described the shim 99 may be removed or other shims may be added to provide for the transverse adjustment of a fluid pump 100 that is supported on the transverse shaft 95.

The pump 100 may be of conventional construction and includes at its lower portion a pair of transversely spaced bearing sleeves 101 slidably fitting the transverse shaft 95. The bracket 96 includes an upwardly, transversely extending portion 102 that is secured by a bolt 103 to an intermediate portion of the pump housing 100. The pump is thus secured rigidly with respect to the rear axle structure 23. As previously stated, shims may be added or removed between the bracket 96 and the angle bar 97 for the purpose of adjusting the pump transversely on the shaft 95. The pump includes a longitudinal, rearwardly extending shaft 104 for driving the pump mechanism. The shaft has keyed thereon a sprocket 105. A drive chain 106 connects the sprocket 105 to the sprocket 93 on the power take-off shaft 92.

The pump is suitably connected to the cylinder 82 for the transmission of fluid thereto under pressure, a fluid line being indicated at 107 in Figure 1. The pump is controlled by means of a control link 108 connected to an arm 109, in turn connected to a transverse rock-shaft 110 mounted in the pump housing 100 (Figure 7).

In the operation of the machine just described, the tractor and the parts mounted thereon may be driven forwardly into a pile of material to be gathered by the scoop 49. Fluid under pressure is transmitted from the pump 100 to the cylinder 82 for moving the force arm 80 forwardly, thus rocking the lift arms 75 upwardly for the raising of the beam structure 46 and loaded scoop 49. The load thus gathered may be transported elsewhere, at which point the scoop 49 may be dumped by release of the latch mechanism 56—62 under control of the lever 64. The control rod 69 may be actuated to return the scoop 49 to normal position after dumping.

The modified form of the invention shown in Figures 9 to 13 concerns particularly the mounting of load-moving means on a tractor having a pair of longitudinally spaced, transverse front and rear axle structures 120 and 121, respectively. A longitudinally extending narrow body 122 is offset laterally to the left of the common longitudinal center line between the axles. The body includes a forward hood and grille structure 123 and a rearwardly extending fuel tank 124 spaced above the body 122. An operator's station 125 is located above the rear axle structure 121 behind a steering wheel 126 connected by a steering rod 127 for operating steering mechanism (not shown) contained in a housing 128 at the forward end of the body 122. The front axle structure 120 includes a pair of transversely spaced steerable front wheels 129. The transversely intermediate portion of the front axle structure 120 is mounted on a longitudinal pivot 130 carried in bracket structure 131 at the forward end of the body. This bracket structure incorporates an attaching element 132 for a purpose to be hereinafter described.

A power plant in the form of an internal combustion engine 133 is carried at the front end of the body 122. A power take-off shaft 134 extends rearwardly at the rear end of the body.

As best shown in Figure 10, the rear axle structure 121 includes a pair of transversely spaced drive wheels 135. It will be noted that the left-hand drive wheel 135 is comparatively closely spaced from the body 122 while the right-hand wheel 135 is spaced a greater distance from the body. The same is true with respect to the right and left front wheels 129. The rear axle structure carries at its left-hand side a depending gear housing 136 including a stub axle 137 connected to the left-hand drive wheel 135. At its right side the axle structure 121 has a transversely extending axle housing 138 carrying at its outer end a depending gear housing 139 having an axle 140 connected to the right-hand drive wheel 135. The operator's station 125 is disposed above the extension axle housing 138. The structure of the tractor in detail is shown in the patent to Rosenthal 2,248,668.

It will be noted that the tractor just described is characterized by an arrangement that provides for a substantial space between the right-hand side of the body 122 and the right-hand front and rear wheels 129 and 135. An important object of the present invention is to provide load-moving means for an attachment to this type tractor.

The tractor has attached thereto a secondary or sub-frame 141 including a rear transverse supporting member 142. This member is preferably carried by a pair of transversely spaced brackets 143 respectively secured to the depending gear housings 138 and 139. The sub-frame further includes a pair of longitudinally parallel frame members on bars 144 disposed respectively at opposite sides of the body 122. The forward ends of the bars are rigidly secured at opposite sides of a forward portion of the power plant 133, and the rear ends of the bars are secured in transversely spaced relation to the transverse support 142 by a pair of bolts 145.

The sub-frame carries at a mid-point of the body 122 between the bottom of the fuel tank 124 and upper surface of the body 122 a supporting structure 146. This structure is very similar to that described as embodied in the machine shown in Figures 1 to 8 and accordingly need not be described in detail. The structure 146 provides for the supporting of lift means including a transverse rock-shaft in the form of a sleeve 147, at opposite ends of which are rigidly secured two forwardly extending lift arms 148. The right-hand end of the rock-shaft has rigidly secured thereto a force arm 149 that depends downwardly alongside the body 122. It will be noted that the force arm lies very close to the common longitudinal center line between the front and rear axles 120 and 121.

The load-moving means comprises a forwardly extending beam structure 150 including a pair of transversely spaced longitudinal beams 151. Since the front axle structure 120 includes the widely spaced wheels 129, the beams 151 are curved upwardly and then downwardly to accommodate these wheels. The rear ends of the beams are connected respectively by pivot means 152 to opposite ends of the transverse support 142. The forward ends of the beams pivotally carry on transverse trunnions 153 a scoop 154. The scoop has a rearwardly extending frame structure 155, the details of which are the same as those shown in Figure 4. A transverse shaft 156 extends across the beams 151 at their forward ends. This shaft carries loosely thereon a pair of transversely spaced, upwardly extending arms 157 and 158. The lower portions of these arms are rigidly cross-connected by a second parallel shaft 159 (Figure 11). The inner arm 158 includes a latch that cooperates with the scoop in the manner described in connection with the structure shown in Figures 1 to 8. The shaft 156 is embraced by a pair of transversely spaced strap members 160 connected to the lower ends respectively of upwardly extending links 161. The upper ends of the links are pivotally connected respectively to the forward ends of the lift arms 148.

The right-hand beam 151 carries an upstanding control lever 162 connected by a link 163 to an upstanding arm 164 pivoted on the beam 151 at the point at which the beam is curved over the front axle structure 120. The arm 164 is in turn connected by a link 165 to the arm 157 on the cross-shaft 156. Operation of the lever 162 controls the latch arm 158 and the latch that engages the rearwardly extending structure 155 on the scoop 154. A second upstanding lever 166 is pivotally carried at its lower end on the right-hand beam 151 and is connected at its upper end to a forwardly extending control link 167 connected at 168 to an upper rear portion of the scoop 154. The upper end of the control link 167 is curved to provide a handle, by means of which an operator on the operator's station may actuate the linkage to return the scoop 154 to its normal position after dumping.

The tractor includes at its rear end a draw-bar 169 having its opposite ends rigidly carried by the depending gear housings 138 and 139. The draw-bar carries at its transverse portion a supporting member 170 to which is connected the rear end of a hydraulic cylinder 171. The cylinder carries a reciprocating piston 172 connected at its forward end at 173 to the lower end of the force arm 149. It will be noted that the force applied by the cylinder 171 is along a line parallel to and closely spaced with respect to the common longitudinal center line between the front and rear axle structures 120 and 121. It will be noted also that the cylinder is disposed below the rear axle structure and at that side of the tractor between the body 122 and the far or right-hand rear wheel 135.

The cylinder 171 is supplied with fluid through a line 174 by a fluid pump 175. As best shown in Figure 13, the pump 175 includes a pair of lower, transversely disposed bearing portions 176 carried for sliding adjustment on a transverse support in the form of a shaft 177 having its opposite ends anchored respectively to brackets 178 on the depending gear housings 138 and 139 of the rear axle structure of the tractor. One side of the pump carries thereon a bracket in the form of an angle bar 179 secured by a removable bolt 180 to an upper extension 181 of the right-hand bracket 178. A plurality of removable shims 182 are disposed between the extension 181 of the bracket 178 and the bracket 179. These shims may be removed or additional shims may be inserted to provide for the adjustment of the pump transversely of the rear axle structure 121 with respect to the rod or shaft 177.

The pump may be of the type illustrated in Figure 7 and includes a rearwardly extending shaft 183 on which is keyed a sprocket 184 driven by a chain 185 trained about the sprocket 184 and about a driving sprocket 186 on the power take-off shaft 134.

The tractor has mounted at the forward end of the body 122 thereof a stabilizer means for restraining relative transverse movement between the tractor and the beam structure 150. The structure of the stabilizer means is best shown in Figure 12. The front housing 128 of the tractor has been previously described as including an attaching portion 132. This portion includes a socket 187 disposed on an axis transversely of the front of the tractor. The attaching portion also includes a rearwardly extending apertured lug 188. The stabilizer preferably comprises a Z-shaped member 189 having a lower transverse portion 190 fitted within the socket 187 and securely held in place in the socket by means of a locking screw 191. The portion 190 of the stabilizer member has rigidly secured thereto as by welding a rearwardly extending member 192 having a rear inwardly bent portion 193 fitting in the aperture of the lug 188 on the attaching portion 132. The intermediate portion of the Z extends upwardly, and the other leg of the Z extends laterally outwardly from the tractor, as at 194.

The leg 194 carries thereon a sleeve 195 held in place by a pin 196. A second sleeve 197 is rigidly secured, as by welding, to the sleeve 195 and extends downwardly and forwardly from the upper portion of the stabilizer member 189. The rod 198 is slidably carried in the sleeve 197 and has its lower end pivoted at 199 to a supporting member 200 carried by the right-hand beam 151 of the beam structure 150. As the beam structure is raised and lowered, the rod 198 may slide in the sleeve 197, and the two sleeves 195 and 197 may pivot about the transverse leg 194 of the stabilizer member 189. The member 189 is held rigidly in place on the tractor body by the means described above. Although this structure does not interfere with the free vertical movement of the beam structure, it does function to restrain relative transverse movement between the beam structure and the tractor.

The stabilizer structure just described may be suitably adapted for use in the structure shown in Figures 1 to 8. Likewise, many of the features of one modification of the invention may be used in the other modification.

The operation of the machine shown in Figures 9 to 13 is very similar to that of the machine shown in Figures 1 to 8. Fluid is supplied by the pump 175 to the cylinder 171 for moving the rock-shaft 147 to raise the beam structure 150. The scoop 154 may be dumped by release of the latch 159 through the medium of the control lever 162. The control linkage 167 may be operated to restore the scoop to normal position.

It will be seen from the foregoing description of the two forms of the invention that an improved load-moving machine has been provided, and that the structures incorporated therein are suitably adapted for attachment to tractors of the agricultural type. In both forms of the invention, the transverse rock-shaft of the lift means is mounted at a mid-point of the tractor, between the power plant and operator's station, and preferably above the body and below the rearwardly extending fuel tank. In both cases, the disposition of the hydraulic power device is such as to provide powerful means for raising the beam structure, at the same time providing for a proper distribution of the weight of the raised beam structure and load. In this respect, another important feature of the invention is the connection of the cylinder to the tractor draw-bar.

It is also important to note the sub-frame, which is detachably connected to the tractor. This frame provides means for bracing the tractor body, which is of considerable importance in the instance of tractors having unitary cast bodies. The sub-frame also provides supporting means for carrying the lifting means so that forces applied to the lifting means are not taken directly by the tractor body at the mid-point thereof but are distributed through the sub-frame to the front and rear portions of the tractor.

The foregoing are only a few of the important objects and features of the invention. Other features will undoubtedly suggest themselves to those versed in the art. It will be understood that many modifications of the forms of the invention shown can be made without departure from the spirit and scope of the invention as defined in the appended claims.

What is claimed is:

1. A tractor-mounted load-moving machine: comprising a tractor having a longitudinal body carried on front and rear wheels and including a draw-bar at the rear of the body; supporting structure carried by the body intermediate its ends and including a transverse rock-shaft; a bell-crank secured to the rock-shaft and including a first longitudinally forwardly extending arm and a second downwardly extending arm; load-moving means including a load-carrying element at the front of the tractor and a longitudinally extending beam connected at its forward end to said element and at its rearward end connected to a rear portion of the tractor body for vertical swinging movement to lift the load-carrying element from a loading position; power-actuated force-exerting means connected between the tractor draw-bar and the second arm of the bell-crank for rocking the rock-shaft; and beam-swinging means connecting the load-moving means and the first arm of the bell-crank for swinging the same to lift the load-carrying element upon the rocking of said rock-shaft.

2. A tractor-mounted load-moving machine: comprising a tractor having a longitudinal body carried on front and rear wheels and including a draw-bar at the rear of the body; supporting structure carried by the body intermediate its ends; lift means carried by said structure and including a member swingable in a vertical plane load-moving means including a load-carrying element at the front of the tractor and a longitudinally extending beam connected at its forward end to said element and at its rearward end connected to a rear portion of the tractor body for vertical swinging movement to lift the load-carrying element from a loading position to a transport position; power-actuated force-exerting means connected between the tractor draw-bar and the lift means to swing the swingable member thereof; and means connecting the load-moving means and the aforesaid swingable member to impart said swinging movement to said beam pursuant to swinging of said swingable member.

3. A tractor-mounted load-moving machine: comprising a tractor having a longitudinal body carried on front and rear wheels and including a draw-bar at the rear of the body; supporting structure carried by the body; lift means carried by said structure; load-moving means including a load-carrying element and a beam connected at one end to said element and at its other end connected to the tractor body for vertical movement to lift the load-carrying element; power-actuated force-exerting means connected between the tractor draw-bar and the lift means to operate the latter; and means connecting the load-moving means and the lift means to impart such vertical movement to said beam upon the lift means being operated by said force-exerting means.

4. A tractor-mounted load-moving machine: comprising a tractor having a longitudinal body, front wheels carrying the front end of the body, a transverse rear axle structure including wheels at the rear end of the body; a sub-frame, including a pair of longitudinally extending members disposed respectively at opposite sides of the body and secured at their forward ends to a forward part of the body and secured at their rear ends to the rear axle structure; load-moving means including a load-carrying element ahead of the tractor front wheels and a pair of longitudinally extending beams disposed respectively at opposite sides of the body and connected at their forward ends to the load-carrying element and at their rear ends pivotally connected on a transverse axis to the rear axle structure; lift means carried by the sub-frame at substantially a midpoint of the body and including a transverse rock-shaft, a pair of forwardly extending lift arms secured to the rock-shaft respectively at opposite sides of the body, and a force arm secured to the rock-shaft; means connecting the lift arms respectively to the beams; force-exerting means; means connecting the force-exerting means to the force arm of the lift means; and means connecting the force-exerting means to the tractor rear axle structure.

5. A tractor-mounted load-moving machine: comprising a tractor having a longitudinal body, front wheels carrying the front end of the body, a transverse rear axle structure including wheels at the rear end of the body; a sub-frame, including a transverse support carried by the rear axle structure, and a pair of longitudinally extending members disposed respectively at opposite sides of the body and secured at their forward ends to a forward part of the body and secured at their rear ends to the transverse support; load-moving means including a load-carrying element and a pair of longitudinally extending beams disposed respectively at opposite sides of the body and connected at opposite ends respectively to the load-carrying element and to the transverse support, said latter connection including a pivot on a transverse axis; lift means carried by the sub-frame and including a transverse rock-shaft, a pair of forwardly extending lift arms secured to the rock-shaft respectively at opposite sides of the body, and a force arm secured to the rock-shaft; means connecting the lift arms respectively to the beams; force-exerting means; means connecting the force-exerting means to the force arm of the lift means; and means connecting the force-exerting means to the tractor rear axle structure.

6. A tractor-mounted load-moving machine: comprising a tractor having a longitudinal body and a draw-bar at its rear; load-moving means including a beam having front and back end portions of which the latter portion is pivotally connected with a back end portion of the longitudinal tractor body, said beam being movable about its pivotal connection through a vertical plane with respect to the tractor, and a load-carrying element connected to the forward end portion of said beam; lift means carried by the body and including a connection to said beam between its end portions, and a force arm extending and movable generally in a vertical longitudinal plane; means for moving the force arm, including force-exerting means connected between the force arm and the tractor draw-bar.

7. A tractor-mounted load-moving machine: comprising a tractor having a longitudinal body and a draw-bar at its rear; load-moving means including a beam having front and back end portions of which the latter portion is pivotally connected with a back end portion of the longitudinal tractor body, said beam being movable about its pivotal connection through a vertical plane with respect to the tractor and a load-carrying element connected to the beam; lift means carried by the body and including a connection to said beam between its end portions, and a force arm extending downwardly along one side of the tractor body and movable generally in a vertical longitudinal plane; means for moving the force arm, including force-exerting means connected between the force arm and the tractor draw-bar and exerting a force generally along a line longitudinally at one side of the tractor body.

8. A tractor-mounted load-moving machine: comprising a tractor having a longitudinal body and a draw-bar at its rear disposed at a level lower than the body; load-moving means including a beam having front and back end portions of which the latter portion is pivotally connected with a back end portion of the longitudinal tractor body, said beam being movable about its pivotal connection through a vertical plane with respect to the tractor, and a load-carrying element connected to the forward end portion of the beam; lift means carried by the body and including a connection to the load-moving means and a force arm extending below the tractor body and movable generally fore and aft of the tractor in a vertical longitudinal plane; and means for moving the force arm, including force-exerting means connected between the force arm and the tractor draw-bar and exerting a force generally along a longitudinally extending line of force below the tractor body.

9. A tractor-mounted load-moving machine: comprising a tractor having a longitudinal body; a draw-bar structure at the rear end of the body; load-moving means connected to the tractor for movement with respect thereto between two positions; and means carried by the tractor for moving the load-moving means and including piston-and-cylinder means connected to the aforesaid draw-bar structure and operable to exert a force along a line longitudinally of the tractor for moving said load-moving means.

10. A tractor-mounted load-moving machine: comprising a tractor having a longitudinal body; a draw-bar structure connected to the tractor at the rear end of the body and extending laterally of the tractor from the point of connection therewith; load-moving means connected to the tractor for movement with respect thereto between two positions; means carried by the tractor for moving the load-moving means and including piston-and-cylinder means connected to the aforesaid draw-bar structure at a point displaced laterally of the tractor from the connection of said structure with the tractor and operable to exert a force along a line longitudinally of the tractor; and brace means connected between the tractor and said draw-bar structure at a point displaced laterally of the tractor from the connection of said structure with the tractor and generally paralleling said line of force.

11. A tractor-mounted load-moving machine: comprising a tractor having a longitudinal body and a rear draw-bar structure; load-moving means connected to the tractor for movement with respect to the tractor; means carried by the tractor for moving the load-carrying means, including a pressure cylinder disposed longitudinally of the tractor body; means connecting said cylinder to the draw-bar, comprising a member connected to the cylinder and having one end pivotally connected to the draw-bar; and brace means connected between the said member and the tractor body to determine the pivoted position thereof about the pivotal connection with the draw-bar.

12. A tractor-mounted load-moving machine: comprising a tractor having a longitudinal body and a rear draw-bar structure; load-moving means connected to the tractor for movement with respect to the tractor; means carried by the tractor for moving the load-carrying means, including a pressure cylinder disposed longitudinally of the tractor body; means connecting said cylinder to the draw-bar, comprising a member connected intermediate its ends to the cylinder and having one end connected to the draw-bar for limited movement of the member with respect to the draw-bar; and a longitudinally extending brace connected between the other end of said member and the tractor body, said brace including an adjustment for adjusting the member with respect to the draw-bar.

13. A tractor-mounted load-moving machine: comprising a tractor having a longitudinal body including a rear axle structure and rear draw-bar, and a front axle structure; load-moving means carried by the tractor for movement from a lowered position to a raised position with respect to the tractor; means for moving the load-moving means, including a fluid-pressure cylinder connected to the draw-bar; a fluid pump carried by the rear axle structure and connected to the cylinder; and means connected between the load-moving means and the tractor front axle structure for restraining relative transverse movement between the tractor and the load-moving means.

14. A tractor-mounted load-moving machine: comprising a tractor having a longitudinal body including a rear axle structure, and a front axle structure; load-moving means carried by the tractor for movement from a lowered position to a raised position with respect to the tractor; means for moving the load-moving means, including a fluid-pressure cylinder connected to the tractor; a fluid pump carried by the rear axle structure and connected to the cylinder; and means connected between the load-moving means and the tractor front axle structure for restraining relative transverse movement between the tractor and load-moving means.

15. In combination, a tractor having a transverse rear axle structure and including a rear power take-off shaft; a fluid-pressure-operated device associated with the tractor; a transverse support carried by and paralleling the rear axle structure; a fluid pump slidably carried by the support for adjustment of the pump transversely of the tractor; means securing the pump in adjusted position and including removable shim elements; a drive shaft journaled in the pump and paralleling the power take-off shaft; and a drive connection between said shafts.

16. A tractor-mounted load-moving machine: comprising a tractor having a longitudinal body, a front axle structure and a rear axle structure, and a draw-bar at the rear of the body; supporting structure carried by the body intermediate its ends and including a transverse rock-shaft; a bell-crank secured to the rock-shaft and including a first longitudinally forwardly extending arm and a second downwardly extending arm; load-moving means including a load-carrying element at the front of the tractor and a longitudinally extending beam connected at its forward end to said element and connected at its rearward end to the rear axle structure of the tractor body for vertical swinging movement; power-actuated force-exerting means connected between the tractor draw-bar and the second arm of the bell-crank for rocking the rock-shaft; means connecting the load-moving means and the first arm of the bell-crank; and means connected between the load-moving means and the tractor front axle structure for restraining relative transverse movement between the tractor and load-moving means.

17. A tractor-mounted load-moving machine: comprising a tractor having a longitudinal body, a power source, a front axle structure, and a draw-bar at the rear of the body; supporting structure carried by the body intermediate its ends and including a transverse rock-shaft; a bell-crank secured to the rock-shaft and including a first arm and a second downwardly extending arm; load-moving means including a load-carrying element at the front of the tractor and a longitudinally extending beam connected at its forward end to said element and connected at its rearward end to a rear portion of the tractor body for vertical swinging movement; power-actuated means connected between the tractor draw-bar and the second arm of the bell-crank for rocking the rock-shaft, and including a fluid-pressure device disposed generally parallel to the tractor body; means connecting the load-moving means and the first arm of the bell-crank; and means connected between the load-moving means and the tractor front axle structure for restraining relative transverse movement between the tractor and load-moving means.

18. A tractor-mounted load-moving machine; comprising a tractor having a longitudinal body including a draw-bar at the rear thereof, and a power source; supporting structure carried by the body; pivotal lift means carried by said structure and including a downwardly depending arm of which the lower end is movable forwardly and rearwardly to pivot such lift means; load-moving means including a load-carrying element and a beam connected at one end to said element and connected at its other end to the tractor body for vertical movement; means connecting said lift means to an intermediate portion of said beam to vertically move the same when the lift means is pivoted; and power-actuated means including a longitudinally disposed fluid-pressure cylinder and piston connected between the tractor draw-bar and the lower end of the lift means arm to pivot said lift means pursuant to movement of the piston in the cylinder.

19. A tractor-mounted load-moving machine: comprising a tractor having a longitudinal body including a power source, and a draw-bar at the rear and below the level of the body; supporting structure carried by the body intermediate its ends; lift means carried by said structure and including a downwardly depending member swingable generally in horizontal alinement with the draw-bar; load-moving means connected to the tractor for movement with respect thereto; means connecting said lift means to said load-moving means for moving the same when said downwardly depending member is swung; and power-actuated means including a generally horizontally extending force-exerting means connected between the tractor draw-bar and the swingable member of the lift means.

20. A tractor-mounted load-moving machine: comprising a tractor having a longitudinal body, a transverse rear axle structure, and a draw-bar at the rear of the body; a sub-frame including a transverse support carried by the rear axle structure, and a pair of longitudinally extending members disposed respectively at opposite sides of the body and connected at their forward ends to a forward part of the body and connected at their rear ends to the transverse support; load-moving means including a load-carrying element and a pair of longitudinally extending beams disposed respectively at opposite sides of the body and connected at opposite ends respectively to the load-carrying element and to the transverse support, said latter connection including a pivot on a transverse axis; lift means carried by the sub-frame and including a transverse rock-shaft, a pair of lift arms secured to the rock-shaft respectively at opposite sides of the body, and a force arm secured to the rock-shaft; means connecting the lift arms respectively to the beams; force-exerting means; means connecting the force-exerting means to the force arm of the lift means; means connecting the force-exerting means to the draw-bar; and brace means connecting the draw-bar to the tractor rear axle structure.

21. In combination, a tractor having a longitudinal body including an attaching element provided with a socket extending transversely of the body; an implement carried by the tractor for vertical movement from a lowered position to a raised position; means for moving the implement vertically; and means for restraining relative transverse movement between the tractor and implement, including a member having a first portion mounted in the socket of the tractor attaching-element and a second portion spaced from the first portion and extending transversely of the tractor, and a vertically slidable connection between the second portion and the implement.

22. In combination, a tractor having a longitudinal body including an attaching element provided with a socket extending transversely of the body; an implement carried by the tractor for vertical movement from a lowered position to a raised position; means for moving the implement vertically; and means for restraining relative transverse movement between the tractor and implement, including a Z-shaped member having one leg mounted in the socket of the attaching element with the intermediate portion of the Z generally paralleling the tractor body and the other leg extending transversely outwardly from the tractor, and a combined transversely pivotable and vertically slidable connection between the second leg and the implement.

23. A tractor-mounted load-moving machine: comprising a tractor having a longitudinal body including a forward power plant and a rear operator's station spaced longitudinally from the power plant; a load-moving means carried by the tractor and including a load-carrying element at the front of the tractor and a longitudinal beam structure having its forward end connected to the load-carrying element and its rear end connected to the tractor body on a transverse pivot axis adjacently to and beneath the operator's station; means for moving the beam structure about said axis, including a transverse rock-shaft disposed above the body in the space between the operator's station and the power plant, a lifting arm secured to and projecting forwardly from the rock-shaft for vertical movement in a plane extending fore and aft of the tractor, and a force arm secured to the rock-shaft for movement in parallelism with said plane; means connecting a forward portion of the lift arm to the beam structure; and power-operated means connected between the tractor body and the force arm for rocking the rock-shaft.

24. A tractor-mounted load-moving machine: comprising a tractor having a longitudinal body including a forward power plant and a rear operator's station spaced longitudinally from the power plant; a load-moving means carried by the tractor and including a load-carrying element at the front of the tractor and a longitudinal beam structure having its forward end connected to the load-carrying element and its rear end connected to the tractor body on a transverse pivot axis adjacently to and below the operator's station; means for moving the beam structure about said axis, including a bell-crank structure having a rock-shaft disposed transversely across and above the body between the power plant and operator's station and a forwardly extending lift arm, and a force arm extending downwardly below the body and movable angularly with the rock-shaft; means connecting a forward portion of the lift arm and beam structure; and power-operated means disposed below the tractor body and connected between the body and a lower portion of the force arm.

25. A tractor-mounted load-moving machine: comprising a tractor having longitudinally spaced front and rear axle structures, each having a pair of transversely spaced wheels, said axle structures having a common longitudinal center line, and a longitudinal body carried by the axle structures and offset transversely from said center line to be disposed near the wheels at one side of the tractor and providing a relatively large space at the other side of the tractor; load-moving means carried by the tractor, including a load-carrying element ahead of the front wheels, and a pair of longitudinal beams respectively at opposite sides of the body and connected at their front ends to the load-carrying element and pivotally connected at their rear ends on a transverse axis to the tractor body; lift means for moving the beams about said axis including a force arm extending and movable in a vertical longitudinal plane in the aforesaid space at the one side of the tractor body; means connecting the lift means and beams; and means connecting the force arm and the tractor, including a force-exerting device disposed in the aforesaid space between the one side of the body and the rear wheel at that side.

26. A tractor-mounted load-moving machine: comprising a tractor having longitudinally spaced front and rear axle structures, each having a pair of transversely spaced wheels, said axle structures having a common longitudinal center line, and a longitudinal body carried by the axle structures and offset transversely from said center line to be disposed near the wheels at one side of the tractor and providing a relatively large space at the other side of the tractor; load-moving means carried by the tractor, including a load-carrying element ahead of the front wheels, and a pair of longitudinal beams respectively at opposite sides of the body and connected at their front ends to the load-carrying element and pivotally connected at their rear ends on a transverse axis to the tractor body; lift means for moving the beams about said axis including a force arm extending and movable in a vertical longitudinal plane in the aforesaid space at the one side of the tractor body; means connecting the lift means and beams; means connecting the force arm and the tractor, including a fluid-pressure device disposed in the aforesaid space between the one side of the body and the rear wheel at that side; and a fluid pump carried by the rear axle structure at the same side of the body.

27. A tractor-mounted load-moving machine: comprising a tractor having longitudinally spaced front and rear axle structures, each having a pair of transversely spaced wheels, said axle structures having a common longitudinal center line, and a longitudinal body carried by the axle structures and offset transversely from said center line to be disposed near the wheels at one side of the tractor and providing a relatively large space at the other side of the tractor; load-moving means carried by the tractor, including a load-carrying element ahead of the front wheels, and a longitudinal beam structure connected at its front end to the load-carrying element and pivotally connected at its rear end on a transverse axis to the tractor body; lift means for moving the beam structure about said axis including a force arm extending and movable in a vertical longitudinal plane in the aforesaid space at the one side of the tractor body; means connecting the lift means and beam structure; means connecting the force arm and the tractor rear axle, including a fluid-pressure device disposed in the aforesaid space between the one side of the body and the rear wheel at that side and below the rear axle structure; and a fluid pump carried by the rear axle structure at the same side of the body.

28. A tractor-mounted load-moving machine: comprising a tractor having longitudinally spaced front and rear axle structures, each having a pair of transversely spaced wheels, said axle structures having a common longitudinal center line, and a longitudinal body carried by the axle structures and offset transversely from said center line to be disposed near the wheels at one side of the tractor and providing a relatively large space at the other side of the tractor; load-moving means carried by the tractor, including a load-carrying element ahead of the front wheels, and a pair of longitudinal beams respectively at opposite sides of the body and connected at their front ends to the load-carrying element and pivotally connected at their rear ends on a transverse axis to the tractor body; lift means for moving the beams about said axis including a force arm extending and movable in a vertical longitudinal plane in the aforesaid space at the one side of the tractor body; means connecting the lift means and beams; means connecting the force arm and the tractor, including a force-exerting device disposed in the aforesaid space between the one side of the body and the rear wheel at that side; and means disposed in said space and connected between the tractor body and the beams for restraining relative transverse movement between the tractor and load-moving means.

29. A tractor-mounted load-moving machine: comprising a tractor having longitudinally spaced front and rear axle structures, each having a pair of transversely spaced wheels, said axle structures having a common longitudinal center line, and a longitudinal body carried by the axle structures and offset transversely from said center line to be disposed near the wheels at one side of the tractor and providing a relatively large space at the other side of the tractor; load-moving means carried by the tractor, including a load-carrying element ahead of the front wheels, and a longitudinal beam structure connected at its front end to the load-carrying element and pivotally connected at its rear end on a transverse axis to the tractor body; lift means for moving the beam structure about said axis including a force arm extending and movable in a vertical longitudinal plane in the aforesaid space at the one side of the tractor body; means connecting the lift means and beam structure; means connecting the force arm and the tractor rear axle, including a fluid-pressure device disposed in the aforesaid space between the one side of the body and the rear wheel at that side; and means disposed in said space and connected between the front axle structure and the beams for restraining relative transverse movement between the tractor and load-moving means.

CARL W. MOTT.

---

CERTIFICATE OF CORRECTION.

Patent No. 2,363,986.  November 28, 1944.

CARL W. MOTT.

It is hereby certified that error appears in the printed specification of the above numbered patent requiring correction as follows: Page 5, second column, line 10, claim 1, after "position" and before the semicolon insert --to a transport position--; line 26, claim 2, after the word "plane" insert a semicolon; line 57, claim 3, for "llft" read --lift--; page 7, second column, line 30, claim 18, for "pivotal" read --pivotable--; and that the said Letters Patent should be read with this correction therein that the same may conform to the record of the case in the Patent Office.

Signed and sealed this 17th day of April, A. D. 1945.

(Seal)

Leslie Frazer

Acting Commissioner of Patents.

tures having a common longitudinal center line, and a longitudinal body carried by the axle structures and offset transversely from said center line to be disposed near the wheels at one side of the tractor and providing a relatively large space at the other side of the tractor; load-moving means carried by the tractor, including a load-carrying element ahead of the front wheels, and a longitudinal beam structure connected at its front end to the load-carrying element and pivotally connected at its rear end on a transverse axis to the tractor body; lift means for moving the beam structure about said axis including a force arm extending and movable in a vertical longitudinal plane in the aforesaid space at the one side of the tractor body; means connecting the lift means and beam structure; means connecting the force arm and the tractor rear axle, including a fluid-pressure device disposed in the aforesaid space between the one side of the body and the rear wheel at that side and below the rear axle structure; and a fluid pump carried by the rear axle structure at the same side of the body.

28. A tractor-mounted load-moving machine: comprising a tractor having longitudinally spaced front and rear axle structures, each having a pair of transversely spaced wheels, said axle structures having a common longitudinal center line, and a longitudinal body carried by the axle structures and offset transversely from said center line to be disposed near the wheels at one side of the tractor and providing a relatively large space at the other side of the tractor; load-moving means carried by the tractor, including a load-carrying element ahead of the front wheels, and a pair of longitudinal beams respectively at opposite sides of the body and connected at their front ends to the load-carrying element and pivotally connected at their rear ends on a transverse axis to the tractor body; lift means for moving the beams about said axis including a force arm extending and movable in a vertical longitudinal plane in the aforesaid space at the one side of the tractor body; means connecting the lift means and beams; means connecting the force arm and the tractor, including a force-exerting device disposed in the aforesaid space between the one side of the body and the rear wheel at that side; and means disposed in said space and connected between the tractor body and the beams for restraining relative transverse movement between the tractor and load-moving means.

29. A tractor-mounted load-moving machine: comprising a tractor having longitudinally spaced front and rear axle structures, each having a pair of transversely spaced wheels, said axle structures having a common longitudinal center line, and a longitudinal body carried by the axle structures and offset transversely from said center line to be disposed near the wheels at one side of the tractor and providing a relatively large space at the other side of the tractor; load-moving means carried by the tractor, including a load-carrying element ahead of the front wheels, and a longitudinal beam structure connected at its front end to the load-carrying element and pivotally connected at its rear end on a transverse axis to the tractor body; lift means for moving the beam structure about said axis including a force arm extending and movable in a vertical longitudinal plane in the aforesaid space at the one side of the tractor body; means connecting the lift means and beam structure; means connecting the force arm and the tractor rear axle, including a fluid-pressure device disposed in the aforesaid space between the one side of the body and the rear wheel at that side; and means disposed in said space and connected between the front axle structure and the beams for restraining relative transverse movement between the tractor and load-moving means.

CARL W. MOTT.

---

CERTIFICATE OF CORRECTION.

Patent No. 2,363,986. November 28, 1944.

CARL W. MOTT.

It is hereby certified that error appears in the printed specification of the above numbered patent requiring correction as follows: Page 5, second column, line 10, claim 1, after "position" and before the semicolon insert --to a transport position--; line 26, claim 2, after the word "plane" insert a semicolon; line 57, claim 3, for "llft" read --lift--; page 7, second column, line 30, claim 18, for "pivotal" read --pivotable--; and that the said Letters Patent should be read with this correction therein that the same may conform to the record of the case in the Patent Office.

Signed and sealed this 17th day of April, A. D. 1945.

(Seal)

Leslie Frazer

Acting Commissioner of Patents.